(12) United States Patent
Zhang

(10) Patent No.: US 7,779,552 B1
(45) Date of Patent: Aug. 24, 2010

(54) MEASURING APPARATUS

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/611,123

(22) Filed: Nov. 3, 2009

(30) Foreign Application Priority Data

Jul. 3, 2009 (CN) .................. 2009 1 0304013

(51) Int. Cl.
*G01B 1/00* (2006.01)
*G01B 3/00* (2006.01)
*G01B 5/00* (2006.01)

(52) U.S. Cl. .................. 33/549; 33/503; 33/556

(58) Field of Classification Search .......... 33/549, 33/550, 551, 503, 504, 1 M, 1 N, 556, 559, 33/568, 573
See application file for complete search history.

(56) References Cited

U.S. PATENT DOCUMENTS

| | | | |
|---|---|---|---|
| 7,421,795 B2 * | 9/2008 | Mysore et al. ............... | 33/568 |
| 7,578,068 B2 * | 8/2009 | Zhang et al. ............... | 33/501.6 |
| 2008/0028627 A1 * | 2/2008 | Mysore et al. ............... | 33/568 |
| 2008/0141547 A1 * | 6/2008 | Zhang et al. ............... | 33/534 |
| 2009/0277030 A1 * | 11/2009 | Zhang ........................ | 33/533 |

* cited by examiner

*Primary Examiner*—Yaritza Guadalupe-McCall
(74) *Attorney, Agent, or Firm*—Zhigang Ma

(57) ABSTRACT

A measuring apparatus includes a workbench including a fixing board, four trigger units, a sliding member, a positioning unit for fixing an article, an electrical controlling cage, and an indicating member electrically connected to the trigger units. The sliding member includes a receiving body defining a guiding hole, and distal ends of the trigger units are received in the guiding hole. The fixing board, the indicating member and the trigger units are electrically connected to the electrical controlling cage. The electrical controlling cage is turned on, and the article is passed through the guiding hole. If any trigger unit cannot be triggered to turn on the corresponding indicating member, the portion to be measured of the article is qualified; if any trigger unit is triggered to turn on the corresponding indicating member, the portion to be measured on the article is disqualified.

16 Claims, 7 Drawing Sheets

MEASURING APPARATUS

BACKGROUND

1. Technical Field

The disclosure relates to measuring apparatuses, more particularly, a measuring apparatus for measuring parallelism and a distance relative to a reference plane of a shaft object.

2. Description of Related Art

To assure proper functioning, parallelism and a distance relates to a reference plane for a shaft object is strictly required. For example, for a U-shaped heat pipe generally used in an electronic device for dissipating heat and often including two opposite portions, parallelism of the two portions, and a distance between the two portions are important and may impact radiating effect of the heat pipe. An overhead projector or a three-coordinate measuring machine is usually used to measure parallelism and a distance of the two portions of the heat pipe, which is quite inconvenient and inefficient.

DETAILED DESCRIPTION

Figure 1:
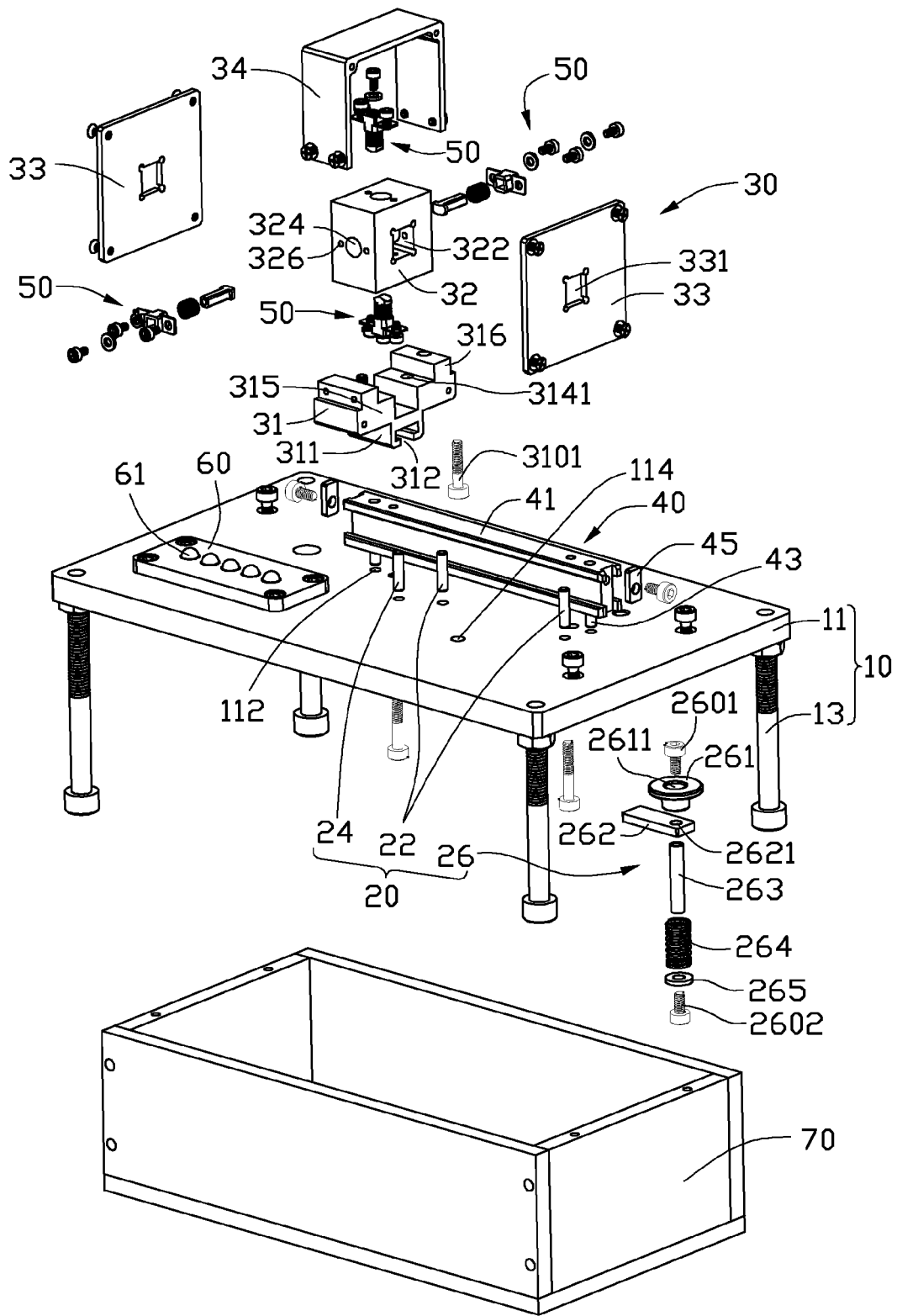
FIG. 1 is an exploded, isometric view of an exemplary embodiment of a measuring apparatus, the measuring apparatus including four trigger units.
Figure 4:
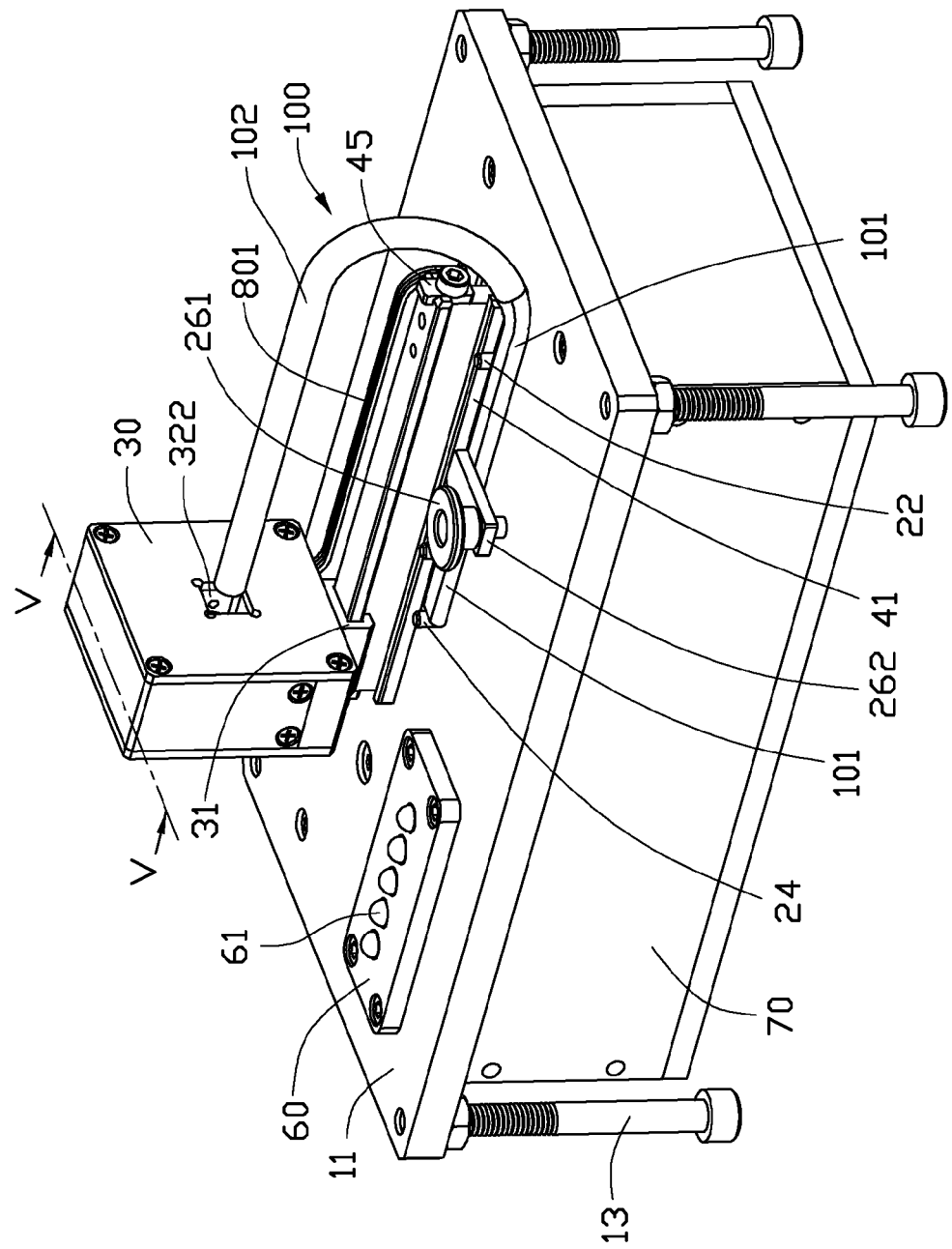
FIG. 4 is similar to FIG. 3, but showing a heat pipe being tested.
Figure 5:
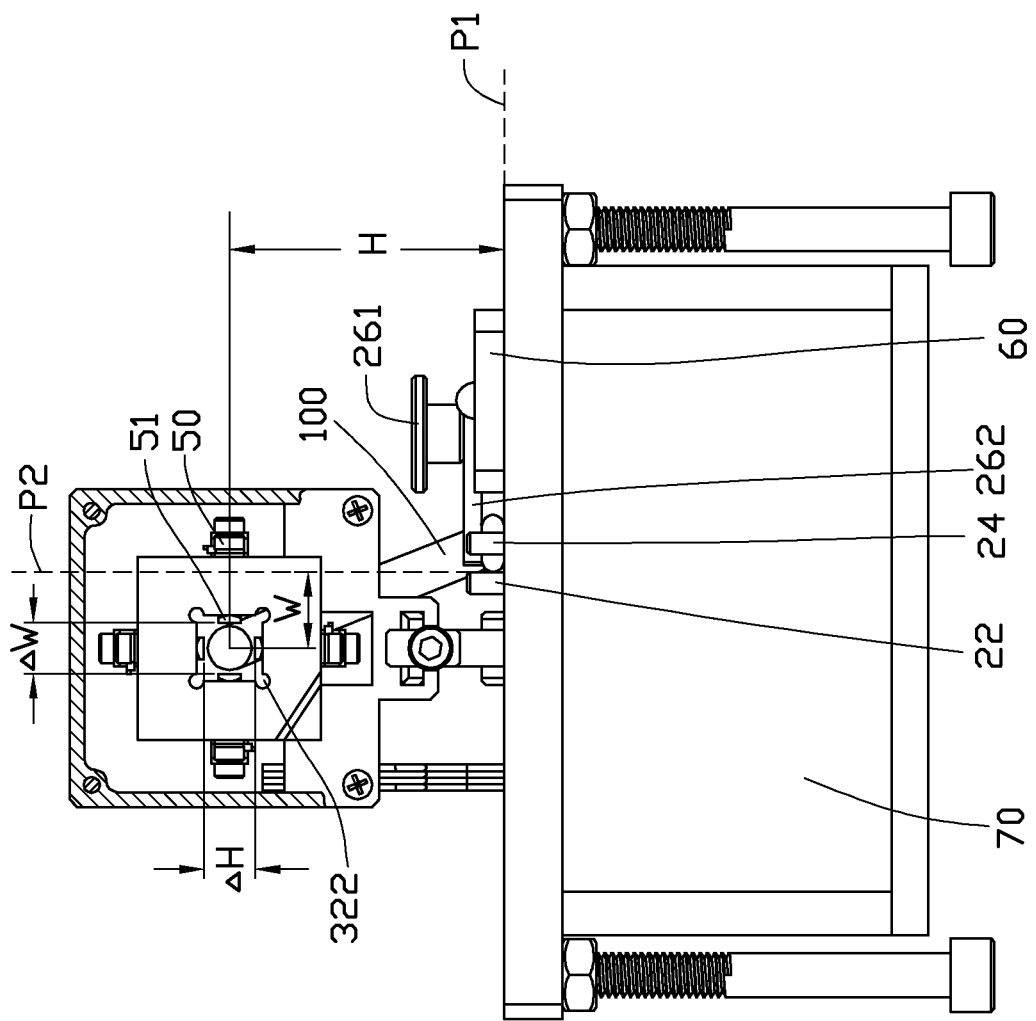
FIG. 5 is a cross-sectional view of FIG. 4, taken along the line V-V.
Figure 6:
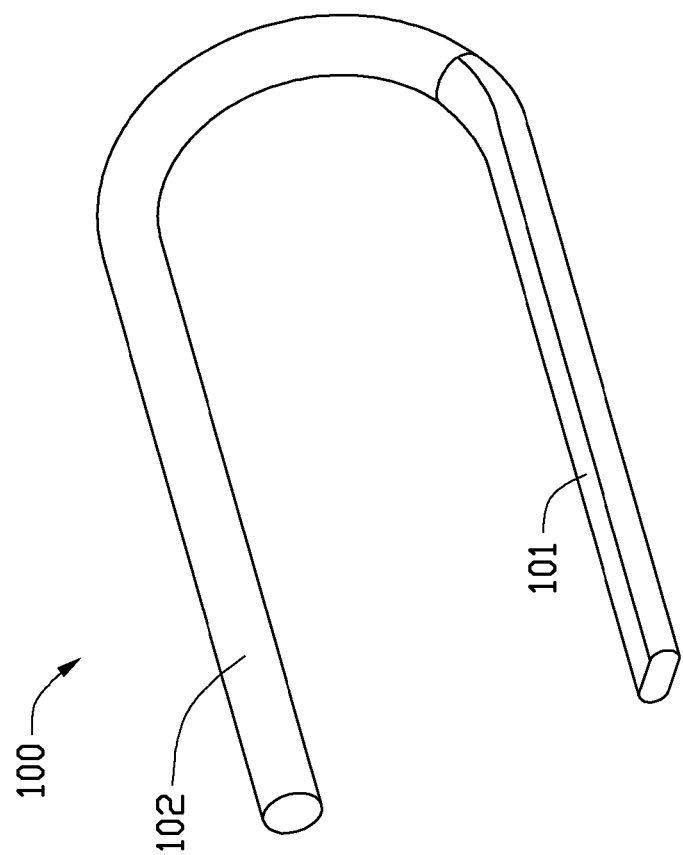
FIG. 6 is an isometric view of the heat pipe of FIG. 4, but viewed from another perspective.
Figure 7:
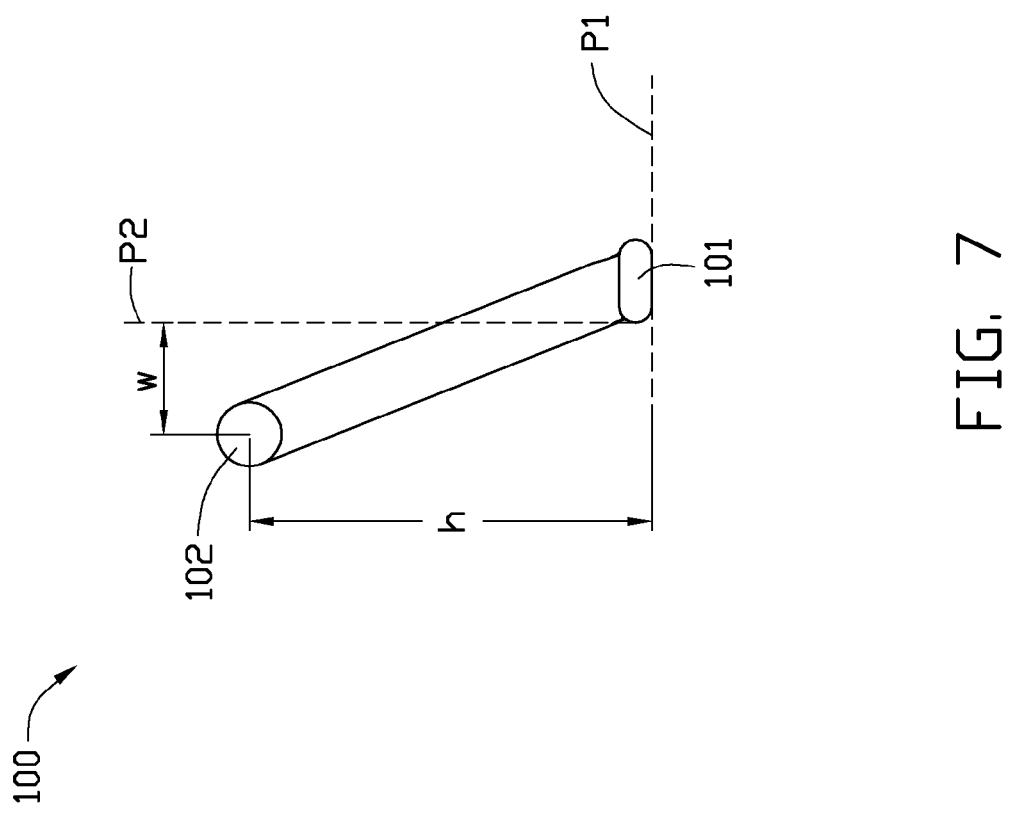
FIG. 7 is a left side view of the heat pipe of FIG. 6.

Referring to FIG. 1, an exemplary embodiment of a measuring apparatus is provided to measure an article having a shaft portion, such as a U-shaped heat pipe 100 (shown in FIGS. 4-7). Referring to FIGS. 6 and 7, the heat pipe 100 includes a positioning portion 101 having a double-D shaped cross-section, and a shaft portion 102 parallel to the positioning portion 101. A first reference plane P1 is a flat surface at a side opposite to the shaft portion 102 of the positioning portion 101. A second reference plane P2 is a tangential of a cambered circumference adjacent to the shaft portion 102 of the positioning portion 101. If the heat pipe 100 meets predetermined requirements, a distance between the first reference plane P1 and the axis of the shaft portion 102 should be h, and a distance between the second reference plane P2 and the axis of the shaft portion 102 should be w.

The measuring apparatus includes a workbench 10, a positioning unit 20, a sliding member 30, a rail member 40, two resisting members 45 mounted to opposite ends of the rail member 40, four trigger units 50, an indicating member 60, and an electrical controlling cage 70.

The workbench 10 includes a fixing board 11 and four screw shafts 13. The screw shafts 13 are crewed into corners of the fixing board 11, for supporting the fixing board 11. Two fixing holes 112, and a pivot hole 114 are defined in a center of the fixing board 11. The fixing holes 112 are situated in a line. The pivot hole 114 is at predetermined distances from the fixing holes 112.

The positioning unit 20 includes two first positioning pins 22, a second positioning pin 24, and a fastening member 26. The fastening member 26 includes an operating portion 261, a resisting portion 262, a guiding shaft 263, a spring 264, a washer 265, and two screws 2601, 2602. A mounting hole 2611 is defined in a center of the operating portion 261. The resisting portion 262 defines a through hole 2621 in a first end of the resisting portion 262. Opposite ends of the guiding shaft 263 define a screw hole (not labeled).

The sliding member 30 includes a fixing block 31, a receiving body 32, two side plates 33, and a U-shaped protecting board 34. The fixing block 31 includes a sliding portion 311 defining a T-shaped sliding slot 312, at a bottom of the fixing block 31. Two separate fixing portions 315 protrude from opposite sides of a top of the sliding portion 311. Each fixing portion 315 defines a fixing hole 3141. A fixing protrusion 316 extends from a top of each fixing portion 315, adjacent to the corresponding fixing hole 3141. The receiving body 32 is generally cuboid-shaped. The receiving body 32 defines a guiding hole 322 extending through front and rear sides of the receiving body 32. A mounting hole 324, and two screw holes 326 at opposite sides of the mounting hole 324 are defined in each remaining side of the receiving body 32. The mounting hole 324 extends to communicate with the guiding hole 322. A through hole 331, corresponding to the guiding hole 322, is defined in a center of each side plate 33.

The rail member 40 include a rail body 41 having an I-shaped cross-section, and two fixing posts 43 perpendicularly extending down from a bottom of the rail body 41.

Figure 2:
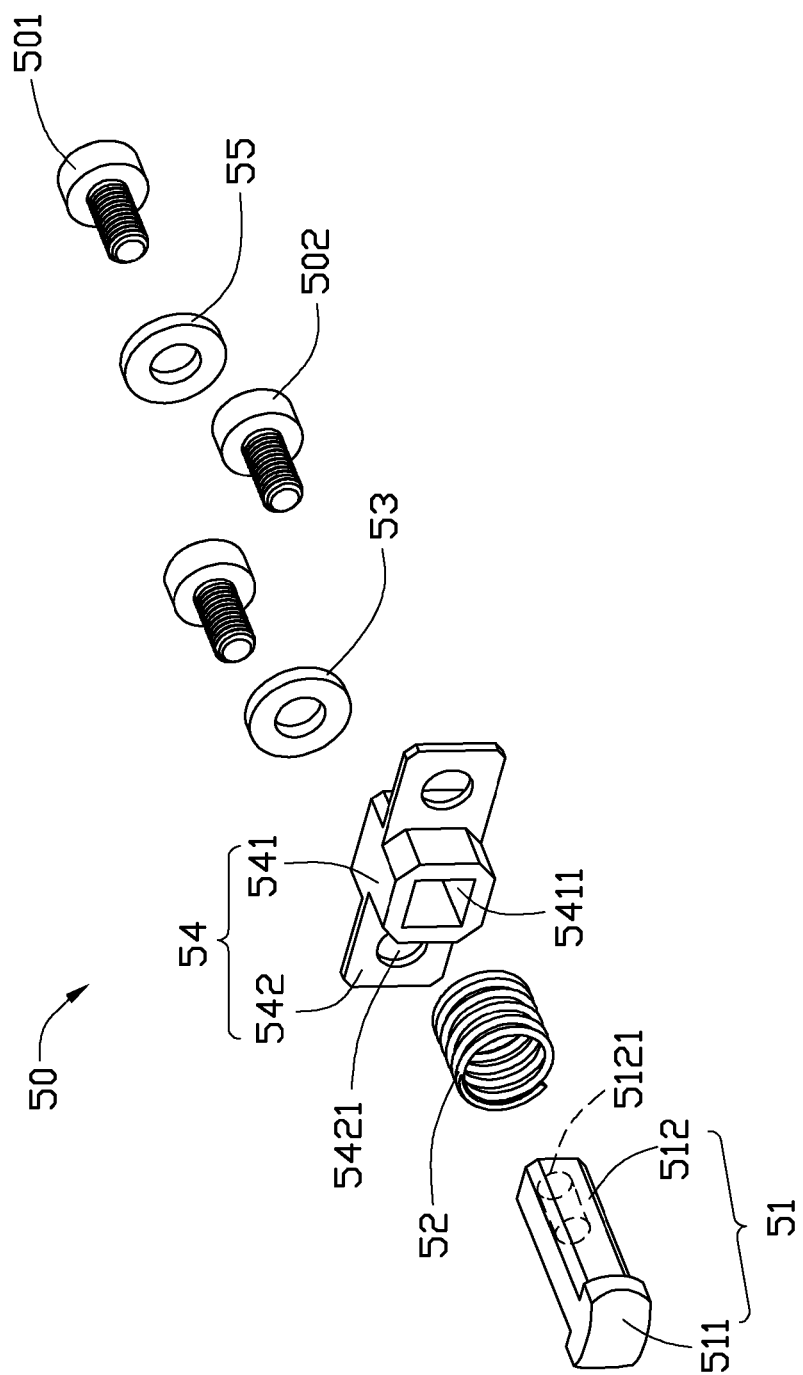
FIG. 2 is an exploded, enlarged view of one trigger unit of FIG. 1.

Referring to FIG. 2, each trigger unit 50 includes a generally T-shaped contact member 51, an elastic member such as a spring 52, a wire connecting member 53, an installing member 54, and a resisting member 55. The contact member 51 includes a contact portion 511, and a fixing portion 512 perpendicularly extending from the contact portion 511. A fixing hole 5121 is axially defined in a distal end opposite to the contact portion 511 of the fixing portion 512. The installing member 54 includes a receiving portion 541 axially defining a through hole 5411, and two fixing portions 542 extending from opposite sides of the receiving portion 541. Each fixing portion 542 defines a fixing hole 5421. To assemble each trigger unit 50, the spring 52 are partially sleeves on the fixing portion 512, and then the fixing portion 512 is passed through the through hole 5411 of the installing member 54. A bolt 501 is passed through the resisting member 55, and then is fixed to the fixing hole 5121 of the contact member 51. Therefore, the spring 52 is received in the through hole 5411 of the installing member 54, and opposite ends of the spring 52 resist against the contact portion 511 of the contact member 51 and the resisting member 55 correspondingly.

Referring again to FIG. 1, the indicating member 60 includes five indicators 61 and a buzzer (not shown). One of the five indicators 61 indicates whether a power supply is turned on or not, and the remaining indicators 61 are connected to the trigger units 50 correspondingly.

Figure 3:
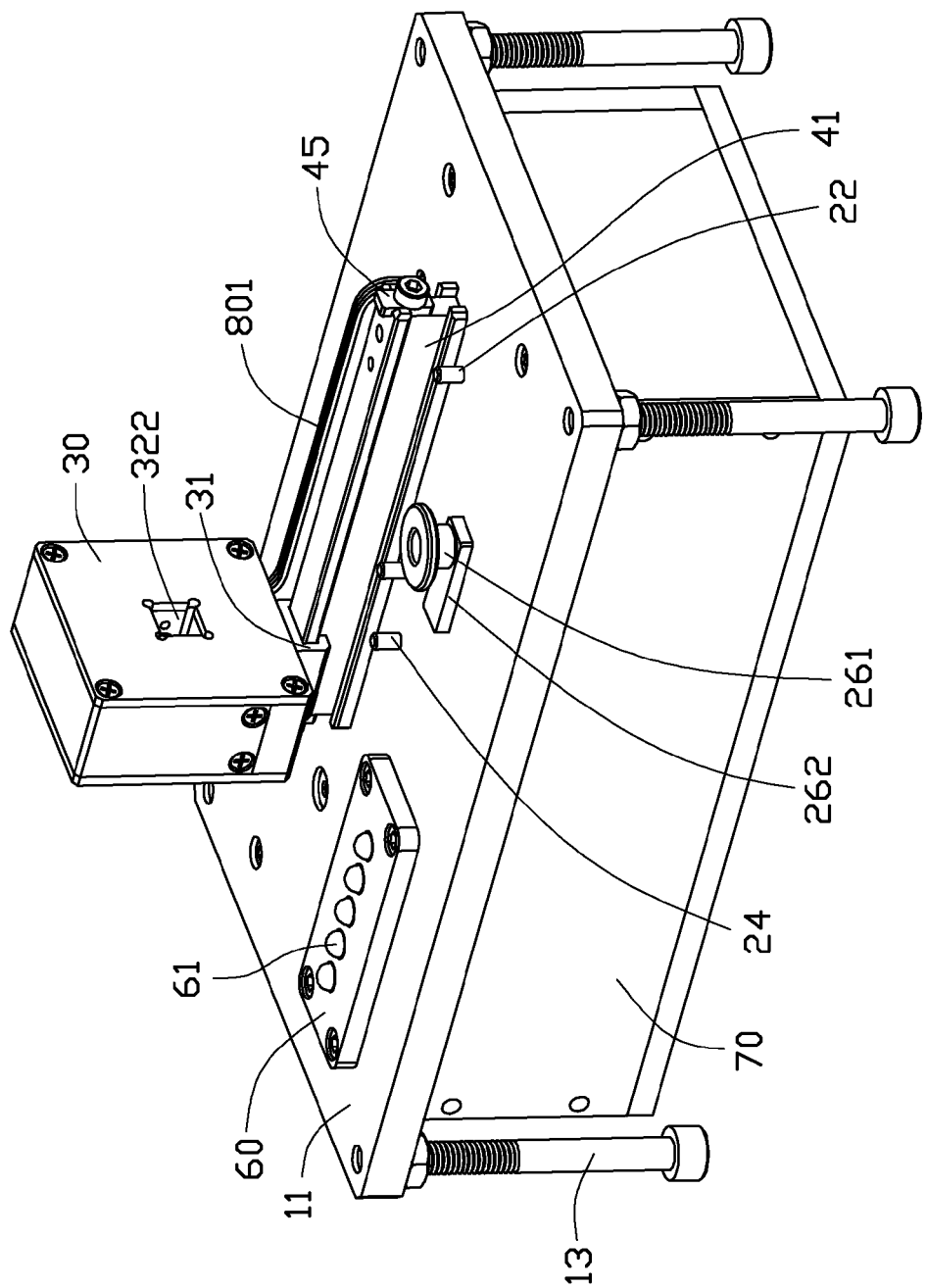
FIG. 3 is an assembled, isometric view of the measuring apparatus of FIG. 1.

Referring to FIG. 3, in assembly, the first and second positioning pins 22 and 24 of the positioning unit 20 are fixed to the fixing board 11. The guiding shaft 263 of the positioning unit 20 is passed through the pivot hole 114 of the fixing board 11. The screw 2601 of the positioning unit 20 is passed through the mounting hole 2611 of the operating portion 261 and the through hole 2621 of the resisting portion 262, and then screwed into the screw hole at a top end of the guiding shaft 263 of the positioning unit 20. Therefore, the operating portion 261 and the resisting portion 262 are located on a top of the fixing board 11. The spring 264 of the positioning unit 20 fits about the guiding shaft 263 below the fixing board 11, and then the screw 2602 of the positioning unit 20 is passed through the washer 265 and screwed into the screw hole at a bottom end of the guiding shaft 263. Therefore, the spring 264 is situated below the fixing board 11, and opposite ends of the spring 264 resist against a bottom of the fixing board 11 and the washer 265.

The fixing posts 43 of the rail member 40 are fixedly engaged in the fixing holes 112 of the fixing board 11, thereby, the rail member 40 is fixed to the workbench 10, and the rail body 41 of the rail member 40 is parallel to the beeline between the two first positioning pins 22. Two bolts 502 (shown in FIG. 2) are passed through the fixing holes 5421 of the installing member 54 of each trigger unit 50, and then screwed into two screw holes 326 of a corresponding side of the receiving body 32 of the sliding member 30. Therefore, the trigger units 50 are fixed to the corresponding sides of the receiving body 32, and the contact portions 511 of the contact members 51 of the trigger units 50 are passed through the corresponding mounting holes 324 of the receiving body 32, and received in the guiding hole 322 of the receiving body 32. The wire connecting member 53 of each trigger unit 50 is mounted to one of the bolts 502, resisting against the bolt 502 and the installing member 54. The wire connecting members 53 of the trigger units 50 are connected to one another by wires 801 (shown in FIG. 3). Two fasteners 3101 are passed through the fixing holes 3141 of the fixing block 31 of the sliding member 30, and then screwed into the bottom side of the receiving body 32. Therefore, the receiving body 32 is fixed to the fixing block 31. The sliding slot 312 of the fixing block 31 fits about the rail body 41, thereby, the sliding member 30 is slidably mounted to the rail member 40. The resisting members 45 are fixed to the opposite ends of the rail body 41, to prevent the sliding member 30 disengaging from the rail member 40.

The electrical controlling cage 70 is fixed and electrically connected to the bottom of the fixing board 11 of the workbench 10. The indicating member 60 is fixed to the top of the fixing board 11, and then the indicating member 60 and the wires 801 are electrically connected to the electrical controlling cage 70. The side plates 33 of the sliding member 30 are fixed to the front and rear sides of the receiving body 32, with the through hole 331 of each side plate 33 aligning with the guiding hole 322 of the receiving body 32. The protecting board 34 is fixed to the fixing protrusions 316, to protect the receiving body 32.

Referring to FIGS. 4 and 5, when the measuring apparatus is fully assembled, the spring 52 of each trigger unit 50 is in a normal state, which is not deformed. A distance between the contact portions 511 of the contact members 51 fixed to the top and bottom sides of the receiving body 32 of the sliding member 30 is ΔH. ΔH equals to a sum of the diameter of the shaft portion 102 of the heat pipe 100 and a tolerance in tolerance limits of h. A distance between the contact portions 511 of the contact members 51 fixed to the left and right sides of the receiving body 32 of the sliding member 30 is ΔW. ΔW equals to a sum of the diameter of the shaft portion 102 of the heat pipe 100 and a tolerance in tolerance limits of w.

In use, the positioning portion 101 of the heat pipe 100 is located on the fixing board 11 of the workbench 10, with the flat surface of the positioning portion 101 contacting the fixing board 11, thereby, the first reference plane P1 is essentially coincident with the top surface of the fixing board 11. The first positioning pins 22 of the positioning unit 20 resist against the circumference of the positioning portion 101, and the second positioning pin 24 of the positioning unit 20 resists against a distal end of the positioning portion 101 of the heat pipe 100. The second reference plane P2 is perpendicular to the fixing board 11, and situated at a coincident position of the first positioning pins 22 and the circumference of the positioning portion 101. The operating portion 261 of the positioning unit 20 is pulled up to deform the spring 264 of the positioning unit 20, and then rotated such that a second end opposite to the first end of the resisting portion 262 abut a flat part facing the shaft body 102 of the positioning portion 101. The operating portion 261 is released, and the resisting portion 262 is moved down via elasticity of the spring 264. Therefore, the resisting portion 262 firmly resists against the flat part of the positioning portion 101, for fixing the heat pipe 100 to the fixing board 11, with the shaft portion 102 of the heat pipe 100 aligned with the guiding hole 322 of the sliding member 30. Therefore, a distance between an axis of the guiding hole 322 of the sliding member 30 and the top of the fixing board 11 is labeled as H, and H equals to h. A distance between the axis of the guiding hole 322 of the sliding member 30 and the second reference plane P2 is labeled as W, and W equals to w.

The electrical controlling cage 70 is turned on to provide high voltage to the fixing board 11 of the workbench 10, and provide lower voltage to each trigger unit 50. The sliding member 30 is slid towards the shaft portion 102 of the heat pipe 100, along the rail body 41 of the rail member 40. Therefore, the shaft portion 102 is slidably passed through the guiding hole 322 of the sliding member 30. In this process, if the shaft portion 102 does not meet predetermined requirements, the shaft portion 102 will hit any the contact member 51 of any trigger unit 50 correspondingly. As a result, the trigger unit 50 becomes electrically connected to the fixing board 11 via the heat pipe 100. Thus, the high voltage of the fixing board 11 changes to lower voltage, hence, the buzzer of the indicating member 60 would go off and one of the indicators 61 corresponding to the trigger unit 50 would lit up. If the shaft portion 102 meets predetermined requirements, the shaft portion 102 of the heat pipe 100 is completely passed through the guiding hole 322 of the sliding member 30 without hitting the contact member 51 of any trigger unit 50, therefore, the buzzer will not go off and any indicator 61 will not lit up.

It is believed that the present embodiment and its advantages will be understood from the foregoing description, and it will be apparent that various changes may be made thereto without departing from the spirit and scope of the description or sacrificing all of its material advantages, the example hereinbefore described merely being exemplary embodiment.

What is claimed is:

1. A measuring apparatus provided to measure an article, the measuring apparatus comprising:
    a workbench comprising a fixing board;
    four trigger units;
    a sliding member slidably mounted to the fixing board, the sliding member comprising a receiving body, a guiding hole defined in the sliding member and extending through two opposite sides of the sliding member, wherein the trigger units are fixed to the receiving body, perpendicular to the guiding hole and pairwise opposite, with distal ends of the trigger units received in the guiding hole, a distance of an axis of the guiding hole and a top of the fixing board substantially equals to a required value satisfied by the article to be measured;
    a positioning unit to fix the article to be measured to the fixing board, a portion to be measured of the article aligned with the guiding hole;
    an electrical controlling cage fixed and electrically connected to the fixing board; and an indicating member fixed to the measuring apparatus, and electrically connected to the trigger units, wherein the indicating member and the trigger units are also electrically connected to the electrical controlling cage;

wherein while the sliding member is slid towards the article, with the portion to be measured passing through the guiding hole, the electrical controlling cage is turned on to power the fixing board and the trigger units; if any trigger unit cannot be triggered to turn on the indicating member, the portion to be measured of the article is qualified; if any trigger unit is triggered to turn on the indicating member, the portion to be measured on the article is disqualified.

2. The measuring apparatus of claim 1, wherein while the electrical controlling cage is turned on, the electrical controlling cage provides high voltage to the fixing board and provides lower voltage to each trigger unit.

3. The measuring apparatus of claim 1, further comprising a rail member, wherein the rail member comprises a rail body fixed to the fixing board and having an I-shaped cross-section, the sliding member further comprises a fixing block defining a T-shaped sliding slot, the receiving body is fixed to the fixing block, the rail body is slidably engaged in the sliding slot.

4. The measuring apparatus of claim 3, further comprising two resisting members, wherein the resisting members are fixed to opposite ends of the rail body, to prevent the fixing block from disengaging from the rail member.

5. The measuring apparatus of claim 1, wherein the positioning unit comprises two first positioning pins, a second positioning pin, and a fastening member, the first and second positioning pins are mounted to the fixing board to resist against the article, and the fastening member is mounted to the fixing board to sandwich the article between the fixing board and the fastening member.

6. The measuring apparatus of claim 5, wherein the two first positioning pins are aligned in a line, and resist against a circumference of the article, the second positioning pin is situated adjacent to one of the first positioning pins, and resists against a distal end of the article.

7. The measuring apparatus of claim 5, wherein the fixing board defines a pivot hole, the fastening member comprises a guiding shaft pivotably engaged in the pivot hole, and a resisting portion fixed to the guiding shaft, the resisting portion is locate on a top of the fixing board, and is operable to press the article.

8. The measuring apparatus of claim 7, wherein the fastening member further comprises a spring, and a washer both mounted to the guiding shaft and blow the fixing board, opposite ends of the spring resist against a bottom of the fixing board and the washer, the resisting portion is operable to be moved away from the fixing board in the pivot hole to deform the spring.

9. The measuring apparatus of claim 7, wherein the receiving body is generally cuboid-shaped, the guiding hole extends through front and rear sides of the receiving body, the four trigger units are fixed to a top, a bottom, a left, and a right sides of the receiving body, respectively.

10. The measuring apparatus of claim 9, wherein each of the top, bottom, left, and right sides of the receiving body defines a mounting hole extending to communicate with the guiding hole, each trigger unit is passed through the corresponding mounting hole.

11. The measuring apparatus of claim 10, wherein each trigger unit comprises a contact member having a contact portion, the contact portion of each trigger unit is received in the guiding hole, facing the contact portion of an opposite trigger unit.

12. The measuring apparatus of claim 9, wherein each trigger unit comprises a contacting member, a spring, an installing member defining a through hole, and a resisting member, the contact portion comprises a fixing portion passed through the through hole of the installing member, the resisting member is fixed to a distal end of the fixing portion, the spring is mounted to the fixing portion, and received in the through hole of the installing member.

13. The measuring apparatus of claim 12, wherein the contacting member further comprises a contact portion received in the guiding hole.

14. The measuring apparatus of claim 12, wherein two fixing portions extend from opposite sides of the installing member, each fixing portion of the installing member defines a fixing hole, two bolts are passed through the fixing holes of the installing member, and then screwed into a corresponding side of the receiving body, for fixing the trigger unit to the sliding member.

15. The measuring apparatus of claim 12, wherein each trigger unit comprises a wire connecting member, the wire connecting member is mounted to the installing member by a bolt, the wire connecting member is electrically connected to the electrical controlling cage via wires.

16. The measuring apparatus of claim 9, further comprising a rail member, wherein the rail member comprises a rail body fixed to the fixing board and a fixing block defining a sliding slot, the receiving body is fixed to the fixing block, the rail body is slidably engaged in the sliding slot.

* * * * *